L. A. YOUNG.
SPRING CONSTRUCTION.
APPLICATION FILED JAN. 24, 1916.

1,264,250.

Patented Apr. 30, 1918.

INVENTOR
Leonard A. Young
BY Ralgemond A. Parker
ATTORNEY

UNITED STATES PATENT OFFICE.

LEONARD A. YOUNG, OF HIGHLAND PARK, MICHIGAN.

SPRING CONSTRUCTION.

1,264,250.　　　　　　　　Specification of Letters Patent.　　　Patented Apr. 30, 1918.

Application filed January 24, 1916. Serial No. 73,805.

*To all whom it may concern:*

Be it known that I, LEONARD A. YOUNG, a citizen of the United States, residing at Highland Park, county of Wayne, State of Michigan, have invented a certain new and useful Improvement in Spring Constructions, and declare the following to be a full, clear, and exact description of the same, such as will enable others skilled in the art to which it pertains to make and use the same, reference being had to the accompanying drawings, which form a part of this specification.

This invention relates to spring cushions, especially to seat cushions for automobiles. It has for its object a spring cushion provided with a rim wire which is arranged to engage the facing of the cushion to hold it in place at one edge. Not only is the rim wire arranged to perform this function but it may also be arranged to engage the springs to hold them in place at the bottom along the outside edges of the cushion.

This construction results in an efficient and yet very simple and cheap spring construction.

In the drawings,—

Figure 1:
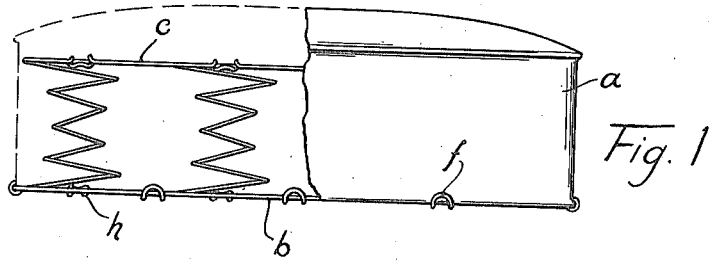
Figure 1 is an end view of the cushion, part of the facing being broken away.
Figure 2:
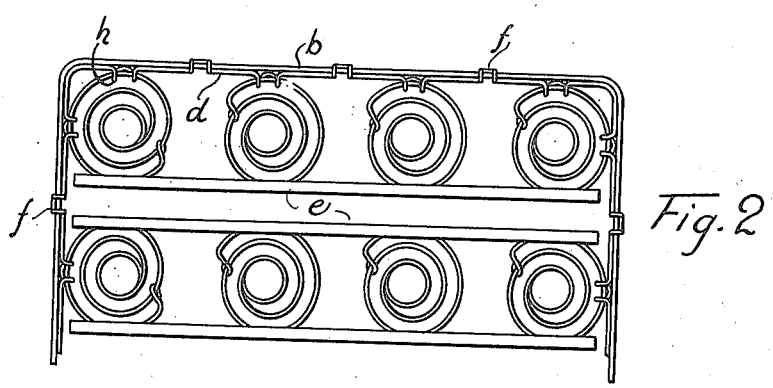
Fig. 2 is a partial bottom plan view.

The spring cushion shown in the drawings is a seat cushion for an automobile. $a$ indicates the facing of the upholstering through which along the bottom edge is threaded a wire $b$. $c$ designates the upper rim wire and $d$ the lower rim wire. Both the upper and lower rim wires are provided with offset loops bent into hook form and which are turned inwardly to engage the end coils of the helical springs to hold the springs in place along the edges of the cushion. Helical springs are connected in rows on the inside by channel bars $e$.

The lower rim wire is not only provided with the inwardly projecting loops bent to hook form but is also provided with outwardly projecting loops bent to hook form and which are designated $f$. The purpose of these is to engage around the bottom edge of the facing $a$ and when pinched over this facing to securely hold the facing in place at the bottom of the spring. There is usually a stiffening wire $b$ in the facing and the hook-like loop $f$ is bent over this inclosed stiffening wire $b$ and the parts are thereby securely locked together.

Preferably Bessemer wire is used for these rim wires inasmuch as it requires soft stock to allow the bending of these abrupt loops.

Figures 3, 4, 5:
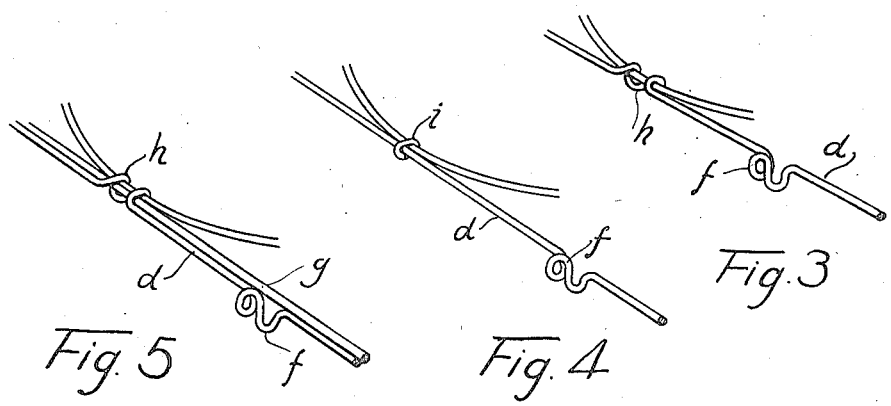
Fig. 3 is a detail of the rim wire and a part of the helical spring.
Fig. 4 is a detail of a modified form.
Fig. 5 is a detail of a still further modified form.

If it is desired to have a stiffer rim along the bottom an additional straight rim wire $g$ can be used as shown in Fig. 5, and the inwardly projecting loop $h$ can be made slightly longer so as to both tie the additional rim wire $g$ and the coil of the helical springs to the main rim wire $d$.

In Fig. 4 instead of using an integral loop to tie the coil of the helical springs to the main wire, a wire clip $i$ is used.

From the above description it will be seen that the rim wire itself will carry the means for fastening the upholstering facing to itself, and this means is simply an integral part of the rim wire, and at the same time if desired, the rim wire may carry the means of fastening the coil springs to itself and this is simply an integral part properly formed.

What I claim is:

1. In a spring construction, the combination of a plurality of helical springs, and a rim wire therefor bent to form fastening devices for the upholstering facing, one edge of which can be held to the rim wire by the fastening portions of said rim wire.

2. In a spring construction, the combination of a plurality of helical springs, and a rim wire therefor, said rim wire being bent into a plurality of loops for engaging the facing of the upholstering, one edge of which can be held to the spring construction by the said loops of the rim wire being turned over such edge.

3. In a spring construction, the combination of a plurality of helical springs, and a rim wire therefor, the said rim wire being provided with integral means for bending over the edge of the upholstering facing to hold the same to the spring construction.

4. In a spring construction, the combination of a plurality of helical springs, and a rim wire therefor bent into integral loops turned into hook form for engaging one edge of the upholstering facing to hold it in place by the hook-like loops being pinched over such edge.

5. In a spring construction, the combination of a plurality of helical springs, a rim wire therefor provided with a plurality of integral loops bent into hook form, and an upholstering facing provided with a stiffening wire along one edge, the said upholstering facing being held in place by the said hook-like loops of the rim wire being turned over the edge containing the stiffening wire.

6. In a spring construction, the combination of a plurality of helical springs, and a rim wire therefor, the said rim wire being provided with integral portions for holding the helical springs to the rim wire and integral portions for holding one edge of the upholstering facing in position.

7. In a spring construction, the combination of a plurality of helical springs, and a rim wire therefor, the said rim wire being bent to hold the helical springs in position and also hold the upholstering facing in position.

8. In a spring construction, the combination of a plurality of helical springs, and a rim wire therefor bent to form oppositely directed loops, the said loops which are directed inwardly being arranged to hold the helical springs in place and the said loops which are bent outwardly being arranged to hold the edge of the upholstering facing in place.

9. In a spring construction, the combination of a plurality of helical springs and a rim wire therefor, said rim wire being bent into a plurality of loops for engaging the facing of the upholstering, an additional rim wire paralleling the first-mentioned rim wire, and means for securing the two rim wires together and to the helical spring coils adjoining.

10. In a spring construction, the combination of a plurality of helical springs, a rim wire therefor provided with a plurality of integral loops bent into hook form, some of the hook-like loops being directed inward and others of the hook-like loops being directed outward, the said inwardly-directed hook-like loops being pinched over convolutions of the helical springs to hold the same in place, and the said outwardly-directed hook-like loops being arranged to receive the upholstering skirt edge and to be pinched thereover to hold the same in place.

In testimony whereof, I sign this specification.

LEONARD A. YOUNG.